United States Patent
Jo et al.

(10) Patent No.: US 8,351,930 B2
(45) Date of Patent: Jan. 8, 2013

(54) METHOD AND APPARATUS FOR PROVIDING AUTOMATIC INTERNATIONAL AND LOCAL CALL DIALING IN A MOBILE COMMUNICATION TERMINAL

(75) Inventors: Sun-Haeng Jo, Busan (KR); Bo-Ram Park, Seoul (KR); Ji-Young Kim, Suwon-si (KR); Seong-Hoon Kang, Suwon-si (KR); Hye-Soo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 250 days.

(21) Appl. No.: 12/689,886

(22) Filed: Jan. 19, 2010

(65) Prior Publication Data

US 2010/0184413 A1    Jul. 22, 2010

(30) Foreign Application Priority Data

Jan. 16, 2009 (KR) .................. 10-2009-0003781

(51) Int. Cl.
*H04M 3/42* (2006.01)
*H04W 4/00* (2009.01)

(52) U.S. Cl. ............... 455/432.1; 455/456.3; 455/414.1; 379/219

(58) Field of Classification Search ............... 455/432.1, 455/435.1, 435.2, 435.3, 433, 456.1, 456.2, 455/414.1, 414.2, 564; 379/219, 229, 221.1, 379/221.2, 221.02

See application file for complete search history.

(56) References Cited

U.S. PATENT DOCUMENTS

| | | | |
|---|---|---|---|
| 5,946,618 A * | 8/1999 | Agre et al. ............... | 455/428 |
| 5,978,678 A * | 11/1999 | Houde et al. .............. | 455/433 |
| 6,259,914 B1 * | 7/2001 | Koster ................. | 455/432.1 |
| 6,587,688 B1 * | 7/2003 | Chambers et al. ......... | 455/433 |
| 6,751,481 B2 * | 6/2004 | Chen et al. .............. | 455/564 |
| 6,782,278 B2 * | 8/2004 | Chen et al. .............. | 455/564 |
| 6,871,069 B1 * | 3/2005 | Cho ..................... | 455/433 |
| 6,941,159 B2 * | 9/2005 | Tsai et al. .............. | 455/564 |
| 7,336,949 B2 * | 2/2008 | Nasielski ............. | 455/435.1 |

FOREIGN PATENT DOCUMENTS

KR    1020060005617    1/2006

\* cited by examiner

*Primary Examiner* — Sonny Trinh
(74) *Attorney, Agent, or Firm* — The Farrell Law Firm, P.C.

(57) ABSTRACT

A method and apparatus for providing automatic international and local call dialing in a mobile communication terminal. Country identification information is received from a network in which the mobile communication terminal is currently located. When a request for an outgoing is received from a user, a country code corresponding to the received country identification information is extracted, and the extracted country code is compared with a country code included in a phone number for the outgoing call. Based on the comparison it is determined whether the outgoing call is an international or local call. The phone number is then changed in accordance with the outgoing call being the international or local call.

12 Claims, 9 Drawing Sheets

METHOD AND APPARATUS FOR PROVIDING AUTOMATIC INTERNATIONAL AND LOCAL CALL DIALING IN A MOBILE COMMUNICATION TERMINAL

PRIORITY

This application claims priority under 35 U.S.C. §119(a) to a Korean Patent Application filed in the Korean Intellectual Property Office on Jan. 16, 2009 and assigned Serial No. 10-2009-0003781, the entire disclosure of which is incorporated herein by reference.

BACKGROUND OF THE INVENTION

1. Field of the Invention

The present invention relates generally to a method and apparatus for automatically dialing international and local calls in a mobile communication terminal, and more particularly, to a method and apparatus in which a mobile communication terminal may automatically change a phone number to be called, in accordance with an international phone number system of a pertinent country or a domestic (or local) phone number system, based on country identification information of a network where the terminal or the user is currently located, and then dial the changed phone number.

2. Description of the Related Art

Normally, to make a domestic (or local) call, a user simply inputs a phone number of called party. However, to make an international call with a current mobile communication terminal, a user needs to first input an international access code (e.g., 001, 00700, etc.) based upon a country where the user is currently located, and then a country code (e.g., 82 for South Korea, 2 for USA, 81 for Japan, etc.) corresponding to a country to which a pertinent phone number belongs, before inputting the actual phone number.

Consequently, a user wishing to make an international calls needs to know and enter both an international access code used in the country in which the user is located and a country code of the phone number.

For convenience, a user may preset an international access code and a country code for each phone number in a terminal. However, if the user then travels outside of their country, the set international access code is useless.

For example, if a user located outside South Korea wants to make a call to a phone number of South Korea (e.g., 02 111 2222) using a terminal, the user must input numbers "+82 02 111 2222" based on an international phone number system of the country, using an international access code "+" commonly used in a mobile communication network or any one of multiple international access codes (e.g., 001, 00700, etc.) used in the country, and a country code "82" of the phone number, in order to place the international call.

If the same user then wants to make a call to the same phone number using the same terminal, after traveling to another country outside South Korea (e.g., USA), the user must now input numbers based on the international phone number system of the USA, using any one of multiple international access codes (e.g., 011, 00720, etc.) used in the USA, instead of the previously used international access code ("+" or 001), and the country code "82". That is, even when the user wants to call the same phone number in the other country, annoyingly, the use still must input and/or change numbers based on the international phone number system of the country in which the user is located.

In addition, if the user then travels back to South Korea with the same terminal, a call to the same phone number must now be made as a local call, not as an international call. Therefore, the user cannot dial number using the previously entered international access code and country code, which were used in other country.

Accordingly, whenever a user makes a phone call after traveling to another country, the user should determine whether a phone number is for an international call or a local call. If the phone number is for an international call, inconveniently, the user must know and enter both the international access code and the country code required for the call. In addition, the phone numbers, which are stored in a phonebook or in a call login the mobile communication terminal, cannot be used when the user travels to countries other than the country in which the initial phone number registration occurred.

SUMMARY OF THE INVENTION

Therefore, the present invention is designed to address at least the above-mentioned problems and/or disadvantages, and to provide at least the advantages described below.

Accordingly, an aspect of the present invention provides a method and apparatus for offering automatic international and local call dialing in a mobile communication terminal.

According to one aspect of the present invention, there is provided a method for providing automatic international and local call dialing in a mobile communication terminal. The method includes: receiving a request for an outgoing call to a previously stored phone number from a user; receiving, receiving by the mobile communication terminal, country identification information from a network in which the mobile communication terminal is currently located; extracting a country code corresponding to the received country identification information; comparing the extracted country code with a country code included in the previously stored phone number; determining whether the outgoing call to the previously stored phone number is for an outgoing international call or an outgoing local call, based on a result of the comparing; changing the previously stored phone number in accordance with an international phone number system of a pertinent country, when the outgoing call to the previously stored phone number is the outgoing international call; changing the previously stored phone number in accordance with a local phone number system, when the outgoing call to the previously stored phone number is the outgoing local call; and dialing the changed phone number.

According to another aspect of the present invention, there is provided an apparatus for providing automatic international and local call dialing in a mobile communication terminal. The apparatus includes: a country identification unit for receiving country identification information from a network in which the mobile communication terminal is currently located; a key input unit including a plurality of keys; a memory for storing country identification information, a country codes, and international access codes corresponding to the country codes; and a controller for extracting from the memory a country code corresponding to the country identification information received from the country identification unit, comparing the extracted country code with a country code included in a phone number for an outgoing call, and making a local call or an international call according to whether the country codes are identical.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 3A to 3C are diagrams illustrating display screens when an outgoing call is made by dialing in a mobile communication terminal according to an embodiment of the present invention;

FIGS. 4A to 4C are diagrams illustrating display screens when an outgoing call is made to a phone number previously stored in a call log, a phonebook, and a SIM card, respectively, according to an embodiment of the present invention;

Throughout the drawings, the same drawing reference numerals will be understood to refer to the same elements, features and structures.

DETAILED DESCRIPTION OF EMBODIMENTS OF THE INVENTION

Figure 1:
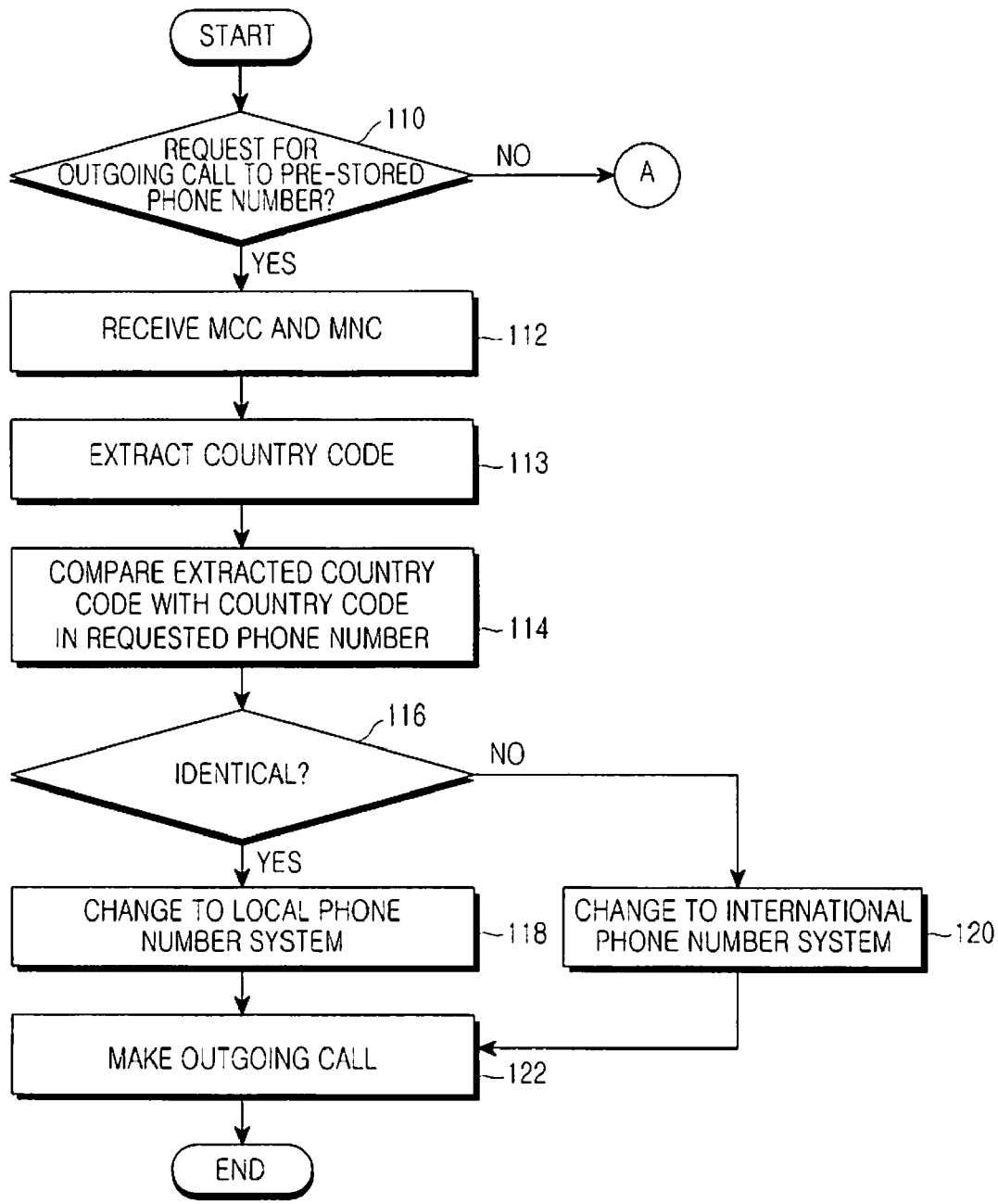
FIG. 1 is a flowchart illustrating a method for providing automatic international and local call dialing in a mobile communication terminal according to an embodiment of the present invention.

The matters defined in the description, such as a detailed construction and elements, are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In accordance with an embodiment of the present invention, a controller of a mobile communication terminal automatically dials international calls or local calls based on the current location of the user, regardless of how the numbers are stored. For automatic dialing, a mobile communication terminal in accordance with an embodiment of the present invention may receive Mobile Country Code (MCC) and Mobile Network Code (MNC) values, which are country identification values for relevant countries from Public Land Mobile Network (PLMN) information provided in the common mobile communication environment, by detecting intercountry travel.

A memory in the mobile communication terminal has a mapping table in which each country code is mapped to its associated MCC and MNC values. Country codes corresponding to their associated MCC and MNC values that the mobile communication terminal can receive from PLMN information in the current location are provided by the mapping table, and based thereon, call connection is possible by adding or changing previously stored phone numbers.

The previously stored phone numbers are stored in a phonebook provided in the mobile communication terminal or in a call record (e.g., phone numbers, incoming/outgoing call times, called parties' names, etc.) generated from incoming/outgoing calls, i.e., a call log in which call information is recorded. The phone number, which includes a country code and an area code for a country where the other party is located, is previously registered by the user as one call information, or may be automatically generated during an outgoing/incoming call.

The mobile communication terminal may compare MCC and MNC values received from the PLMN information with a country code included in the phone number stored in the phonebook, and determine whether the called phone number is going to be an international call or a local call, according to the consistency/discrepancy between the MCC and MNC values and the phone number.

This is applied in the same way, even in a call log in which call information is stored during every occurrence of a call, i.e., according to a generated call record in a common mobile communication terminal.

Accordingly, a user of a mobile communication terminal in accordance with an embodiment of the present invention may place an outgoing call to another party in another country without having to separately input an international access code and a country code at every outgoing call.

Herein, for example, it is assumed that country codes of all counties are previously stored in the memory of the proposed mobile communication terminal in the form of a list in a predetermined order and provided to the user.

FIG. 1 is a flowchart illustrating a method for providing automatic international and local call dialing in a mobile communication terminal according to an embodiment of the present invention.

Referring to FIG. 1, a controller of the mobile communication terminal determines in step 110 whether or not a request for an outgoing call to a previously stored phone number is received from a user. Here, the previously stored phone number represents a phone number that was received directly from the user and is stored in a phonebook, or a phone number in a call log that was automatically generated from incoming/outgoing calls. Additionally, the stored phone number includes a country code. A process of storing a phone number will be described in more detail below with reference to FIGS. 4 and 5.

Upon receiving a request for an outgoing call to a previously stored phone number in step 110, the controller receives MCC and MNC values, which are country identification information, from PLMN information of a network in which the terminal is currently located in step 112. For example, the reception of the MCC and MNC values may be accomplished, upon the request for an outgoing call by the user.

In step 113, the controller identities a country code associated with the MCC and MNC values received in step 112, e.g., from a mapping table stored in the memory.

In step 114, the controller compares the extracted country code associated with the MCC and MNC with a country code included in the phone number that was requested by the user in step 110, and determines in step 116 whether the country codes are identical or not.

If the country codes are identical, in step 118, the controller changes the requested phone number in accordance with a local phone number system, because the user is requesting an outgoing call to the same country as the country where he is currently located, i.e., the requested call is a local call.

For example, when the phone number previously stored in the phonebook or the call log includes a country code of the phone number, e.g., a country code "82" for South Korea, along with a phone number, e.g., "02 999 9999", the controller changes the phone number by removing the identical country code from the previously stored phone number "82 02 999 9999" because the terminal is located in South Korea, and therefore, dialing the country code is unnecessary.

However, if the country codes are not identical, i.e., the call is an international call, in step 120, the controller changes the phone number in accordance with the international phone number system corresponding to the country in which the user is currently located. For example, if the user was in the USA, calling to South Korea, the controller would add "011" before "82 02 999 9999".

When the requested phone number is changed in accordance with the international phone number system, use/nonuse of a trunk code may also taken into consideration.

In brief, a trunk code represents a number added at the front of a code such as an area code and a mobile service identification code. In South Korea, the trunk code is "0", and is attached to the forefront in a predetermined phone number with an identification code such as an area code (e.g., 02, 031, 054, ... ) and a mobile service identification code (e.g., 011, 016, 010, ... ). Similarly, "0" is also used as the trunk code in Japan. In China, "0" is used as a trunk code in an area code, but the trunk code is not used in a mobile service identification code. That is, every country has a different manner for handling trunk codes.

A mobile communication terminal in accordance with an embodiment of the present invention, in which a country-based trunk code table is provided, may recognize a country code based on MCC and MNC values acquired from PLMN information, and determine use/nonuse of a trunk code in a country corresponding to the country code using the trunk code table. Accordingly, the mobile communication terminal may change the phone number in accordance with the international phone number system of the country by deleting or combining the trunk code. A process of changing a phone number in accordance with a trunk code of each country will be described in more detail below with reference to FIGS. 6A and 6B.

In step 122, the controller places an outgoing call to the phone number changed in step 118 or step 120.

Figure 2:
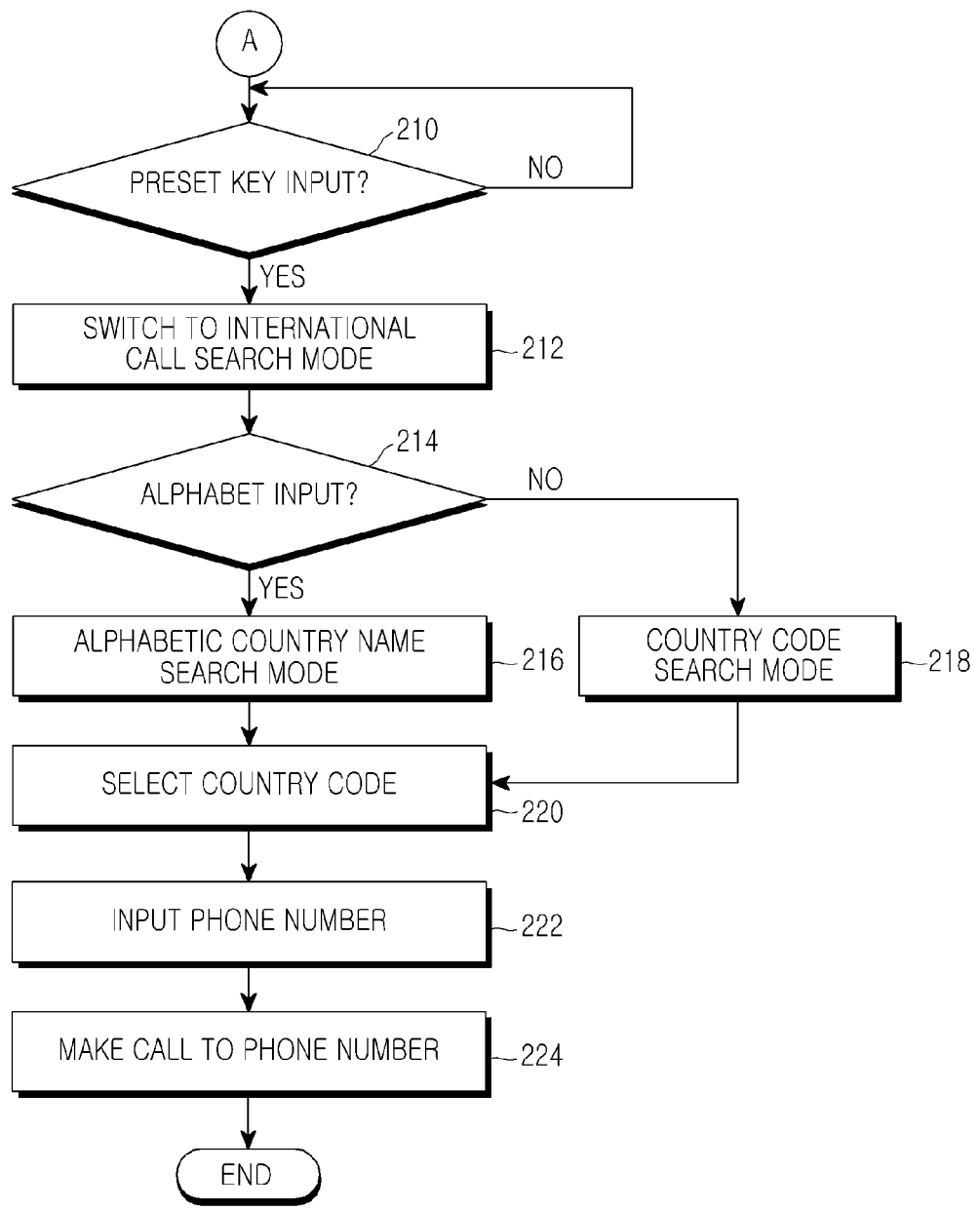
FIG. 2 is a flowchart illustrating a method for making an outgoing international call by dialing a number into a mobile communication terminal according to an embodiment of the present invention.

Referring back to step 110, if a user does not request an outgoing call using a previously stored phone number, the controller the controller determines in step 210 whether or not a preset key is input by the user, as is illustrated in FIG. 2.

FIG. 2 is a flowchart illustrating a method for making an outgoing international call by dialing a number into a mobile communication terminal according to an embodiment of the present invention.

Referring to FIG. 2, in step 210, the controller determines whether or not the user inputs a preset key. For example, the preset key is set as "0" in the description; however, those of ordinary skill in the art will recognize that various changes and modifications of the embodiments described herein can be made without departing from the scope and spirit of the invention, i.e., the preset key could be any other key.

Figures 3A, 3B:
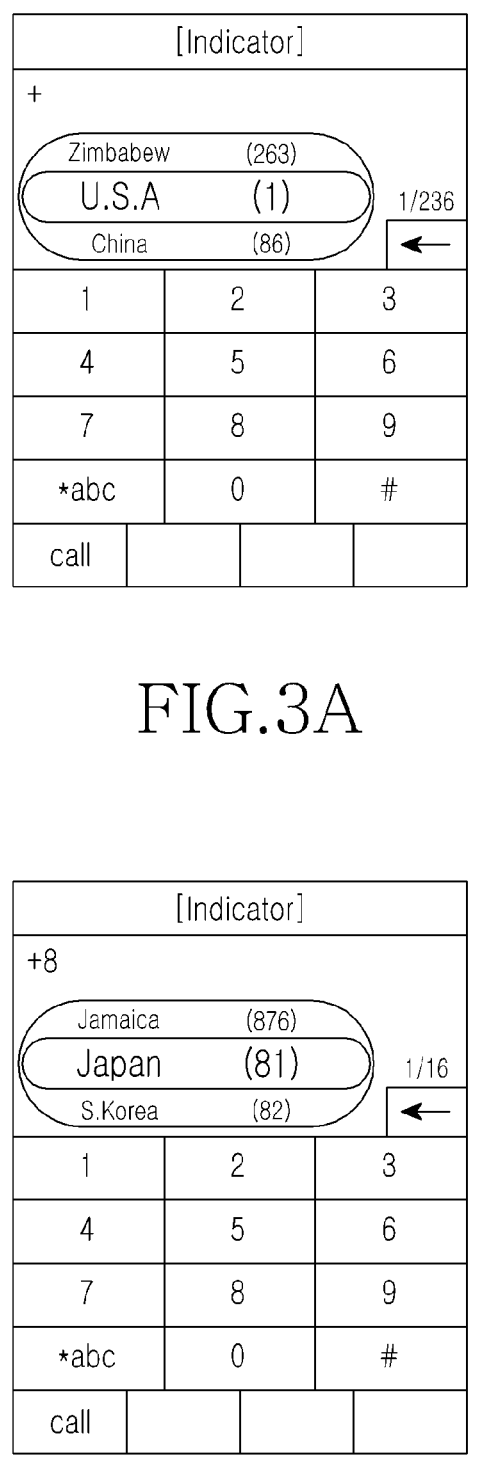

If the preset key, e.g., "0", is input in step 210, "+" indicating an international access code is displayed on a display screen of the mobile communication terminal as illustrated in FIG. 3A. At the same time, in step 212, the controller switches to an international call search mode in which it can search for a country code.

Figure 3C:
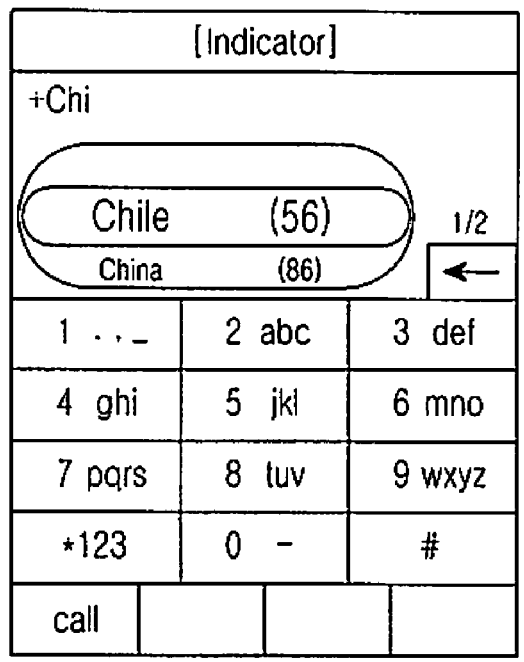

In step 214, the controller determines if alphabetic letters are input. That is, the controller determines if alphabetic letters are input, as illustrated in FIG. 3C. When alphabetic letters are input, the controller switches its search mode to an alphabetic country name search mode and displays at least one country and its country code corresponding to the input alphabetic letters in step 216.

However, if an input is not alphabetic letters, in step 218, the controller switches to a country code search mode as illustrated in FIG. 3B, recognizing that a number(s) is input, and then displays at least one country name and country code corresponding to the input number.

Both the alphabet search mode (FIG. 3C) and the number search mode (FIG. 3B) can be provided because a memory supporting country codes of all countries is included in the mobile communication terminal.

After step 216 or step 218, if a country code is selected on the display screen in step 220, the controller inputs a phone number to which the user intends to call in step 222, and makes an outgoing call to the phone number in step 224.

Figure 4A:
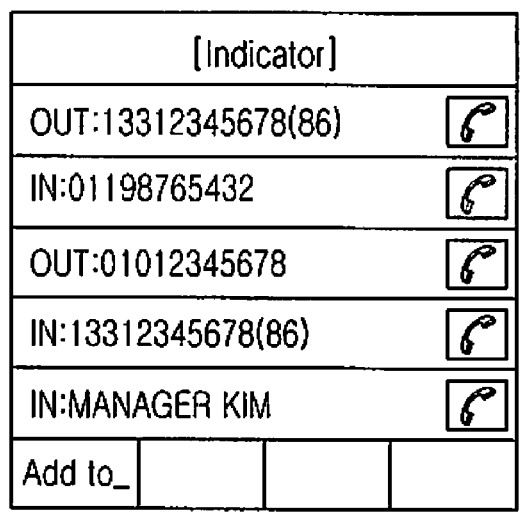
Figures 4B, 4C:
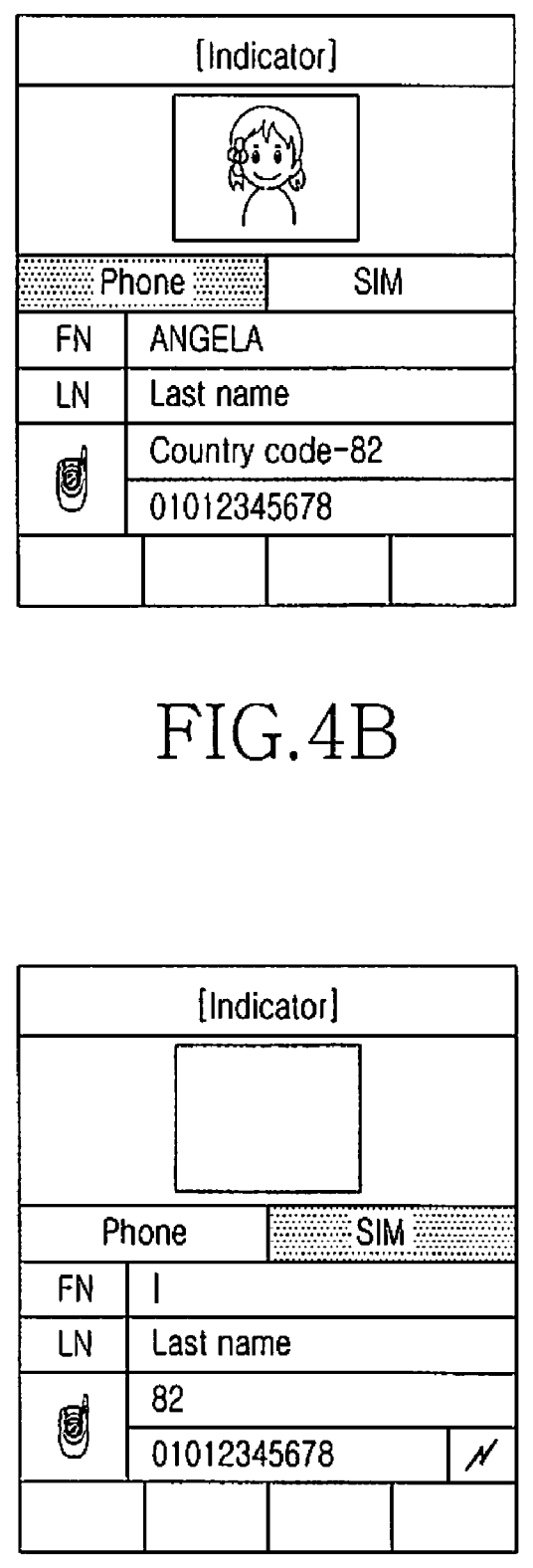

FIGS. 4A to 4C are diagrams illustrating display screens when an outgoing call is made to a phone number previously stored in a call log, a phonebook, and a SIM card, respectively, according to an embodiment of the present invention.

Further, FIG. 5 is a flowchart illustrating a method of making an outgoing call to a phone number previously stored in a call log according to an embodiment of the present invention.

Figures 5A, 5B, 5C:
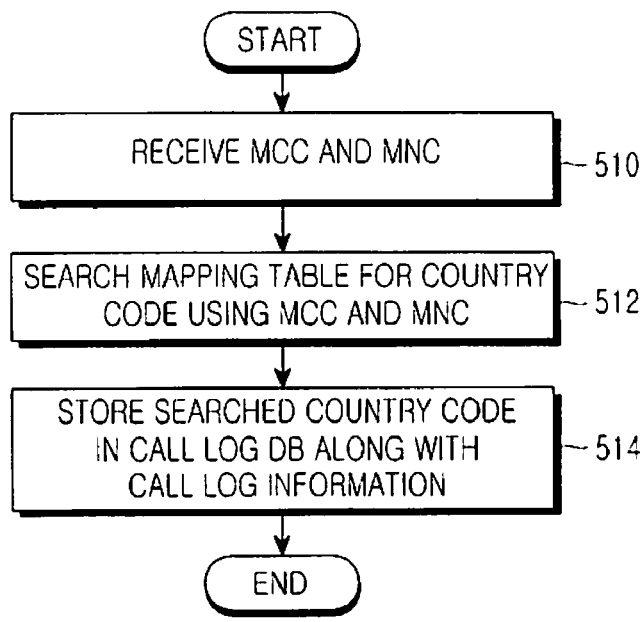
FIG. 5A is a flowchart illustrating a method of making an outgoing call to a phone number previously stored in a call log according to an embodiment of the present invention.
FIG. 5B illustrates a mapping table in accordance with an embodiment of the present invention.
FIG. 5C illustrates a database (DB) along with a call log in accordance with an embodiment of the present invention.

Referring to FIG. 5A, in step 510, upon receipt of a request for an outgoing call by retrieving a phone number from a call log, a controller of the mobile communication terminal receives MCC and MNC values from PLMN information of a network in which the terminal is currently located. Thereafter, in step 512, the controller searches for a country code associated with the MCC and MNC values in a mapping table stored in a memory. An example of a mapping table 516 in accordance with an embodiment of the present invention is illustrated in FIG. 5B

In step 514, the controller stores the country code that is searched from the mapping table 516 in a database (DB) 520, as illustrated in FIG. 5C, along with a call log, for example, a phone number, an incoming/outgoing call time, a called party name, etc.

Thereafter, the controller displays the call log including the calling/called phone numbers and their associated country codes, as illustrated in FIG. 4A.

However, the controller does not display a country code associated with a country of the user who is in possession of the proposed mobile communication terminal. In this regard, the controller may control whether to display the user's country code by comparing the MCC and MNC values acquirable from the PLMN information with the previously stored user's country code.

FIG. 4B illustrates a display screen when an outgoing call is made to a phone number previously stored in a phonebook according to an embodiment of the present invention.

Referring to FIG. 4B, as a phone number and its associated country code are stored together in the phonebook, when making an outgoing call using the phonebook, a controller of the mobile communication terminal searches a mapping table stored in a memory for a country code associated with MCC and MNC values acquirable from PLMN information of a network in which the terminal is currently located, and then makes an international or local call according to consistency/discrepancy between the values.

As to a phone number with a country code that is stored in the phonebook, the user may directly input them using a keypad, or may directly store the call information recorded in the call log, in the phonebook.

The same is possible even when an outgoing call is made to the phone number stored in a Subscriber Identification Module (SIM) card. For example, a display screen when an outgoing call is made to a phone number previously stored in the SIM card is illustrated in FIG. 4C.

Figure 6A:
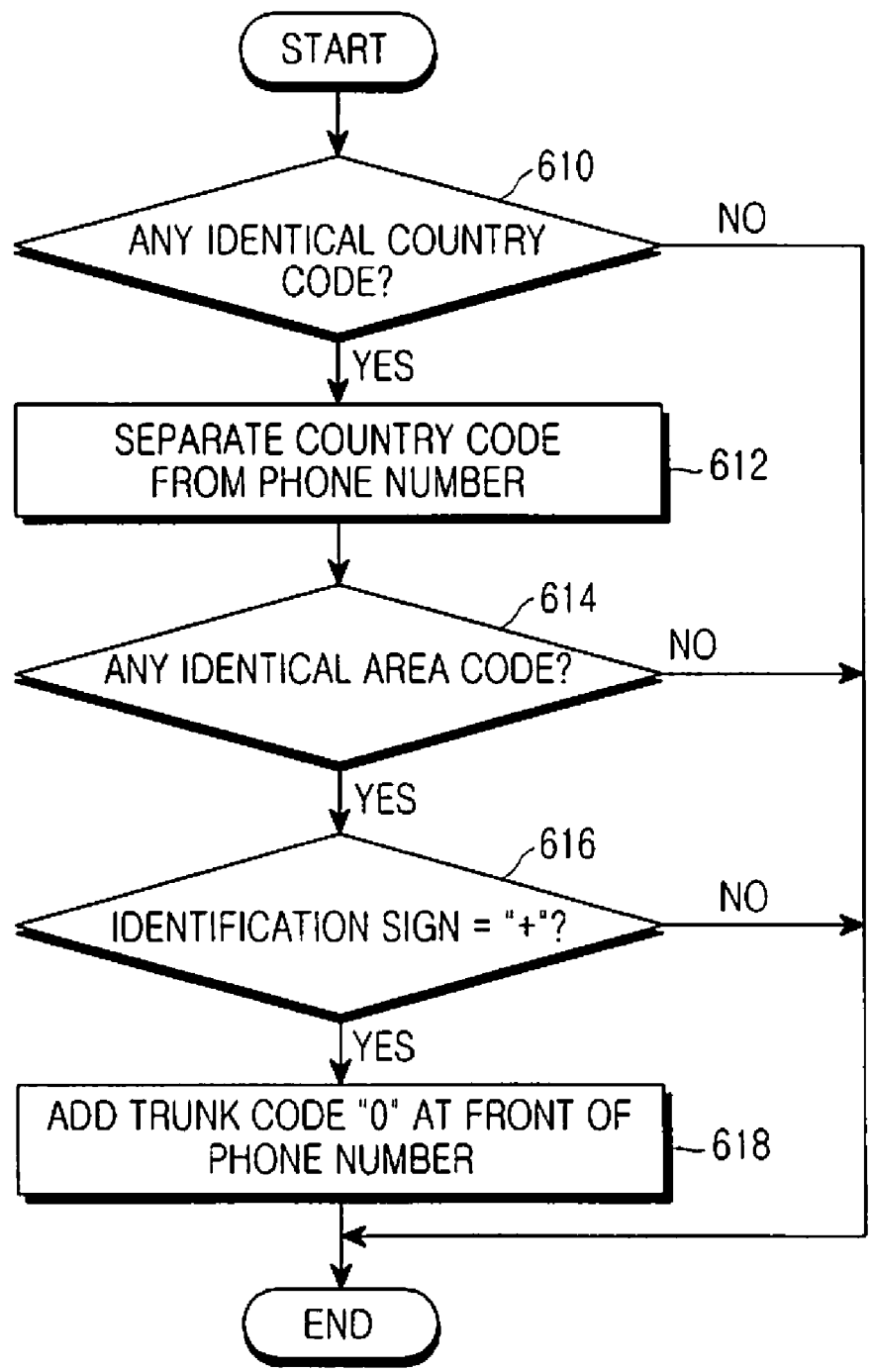
FIGS. 6A and 6B are flowcharts illustrating methods of handling trunk codes when making a call to a phone number with a country code stored in a call log or a phonebook according to an embodiment of the present invention.
Figure 6C:
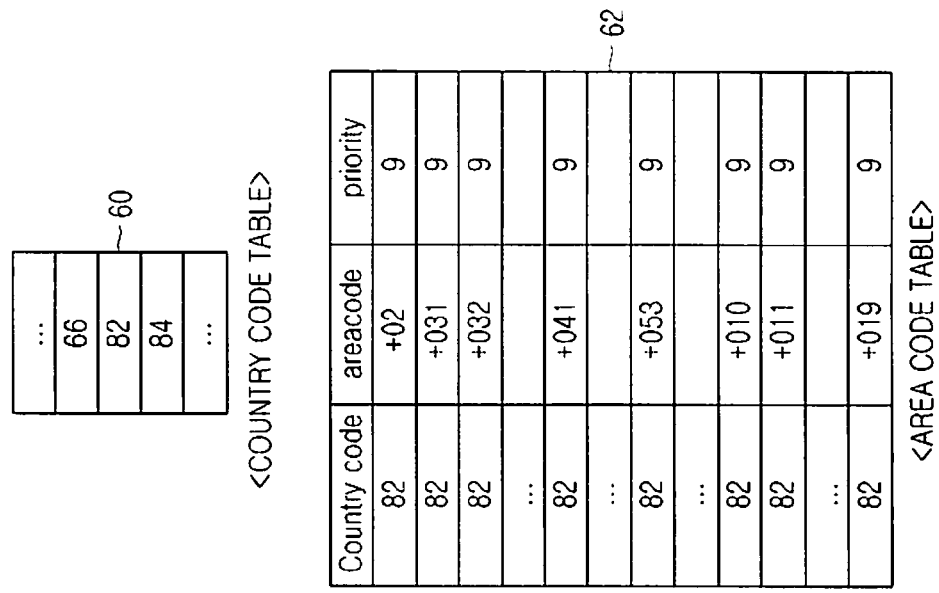
FIG. 6C illustrates a country code table and an area code table in accordance with an embodiment of the present invention.
Figure 6B:
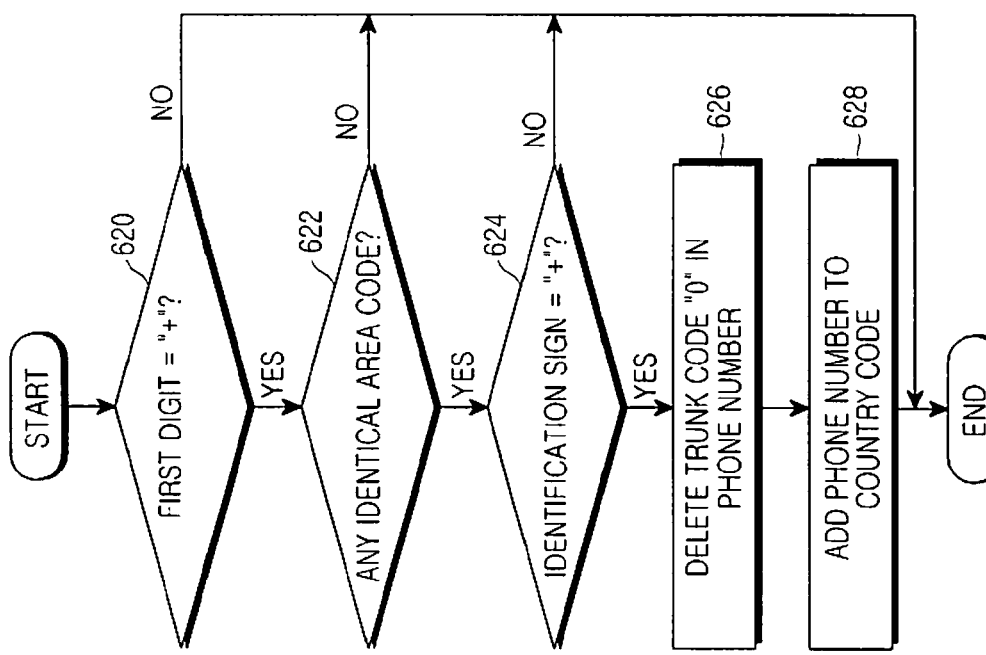

FIGS. 6A and 6B are flowcharts illustrating methods of handling trunk codes when making a call to a phone number with a country code stored in a call log or a phonebook according to an embodiment of the present invention.

However, before a description of FIGS. 6A and 6B is given, in accordance with an embodiment of the present invention, it is assumed that a country code table, in which all countries are mapped to their associated country codes, and an area code table, in which respective areas in a specific country are mapped to their associated area codes, are included in a memory in the mobile communication terminal.

Referring to FIG. 6A, the flowchart illustrates, as an example, a method of how to handle trunk codes when call logs generated during outgoing calls from other countries to South Korea or phone numbers in the call logs are stored in the phonebook, i.e., how to redial the phone numbers in South Korea, which were dialed (or stored) from other countries to South Korea.

Referring to FIG. 6A, when an outgoing call is requested using a certain phone number with a country code (e.g., +821195301234), which is stored in a call log or a phonebook, if it is determined through steps 112 to 118 of FIG. 1 that the requested outgoing call is a local call, a controller of the mobile communication terminal determines in step 610 whether a country code identical to that of South Korea exists in a country code table 60, as illustrated in FIG. 6C.

If there is an identical country code, the controller separates a country code "82" from the phone number in step 612. However, in the absence of the identical country code, the controller ends the operation.

In step 614, the controller determines whether an area code identical to any of area codes in an area code table 62 exists at the front of the phone number "02 111 2222" from which the country code was separated.

If there is an identical area code "02," the controller determines in step 616 whether an identification sign in the identical area code is "+". If an identification sign in the identical area code is "+", the controller adds "0" corresponding to a trunk code at the head of the remaining phone number in step 618.

FIG. 6B illustrates a method of how to handle trunk codes when, for example, call logs generated during outgoing calls to local areas in South Korea or phone numbers in the call logs are stored in the phonebook, i.e., how to place an outgoing call from other countries to South Korea.

Referring to FIG. 6B, when an outgoing call is requested using a certain phone number with a country code, which is stored in a call log or a phonebook, if it is determined through steps 112 to 118 of FIG. 1 that the requested outgoing call is an international call, a controller of the mobile communication terminal determines in step 620 whether a first digit of the phone number is a sign "+". If a first digit of the phone number is a sign "+", the controller determines in step 622 whether an area code identical to any of area codes in the area code table 62 exists at the front of the phone number, and determines in step 624 whether an identification sign in the identical area code is "+".

After confirming the identification sign "+" in step 624, the controller deletes the trunk code "0" from the phone number in step 626, and adds the phone number to the country code in step 628.

Figure 7:
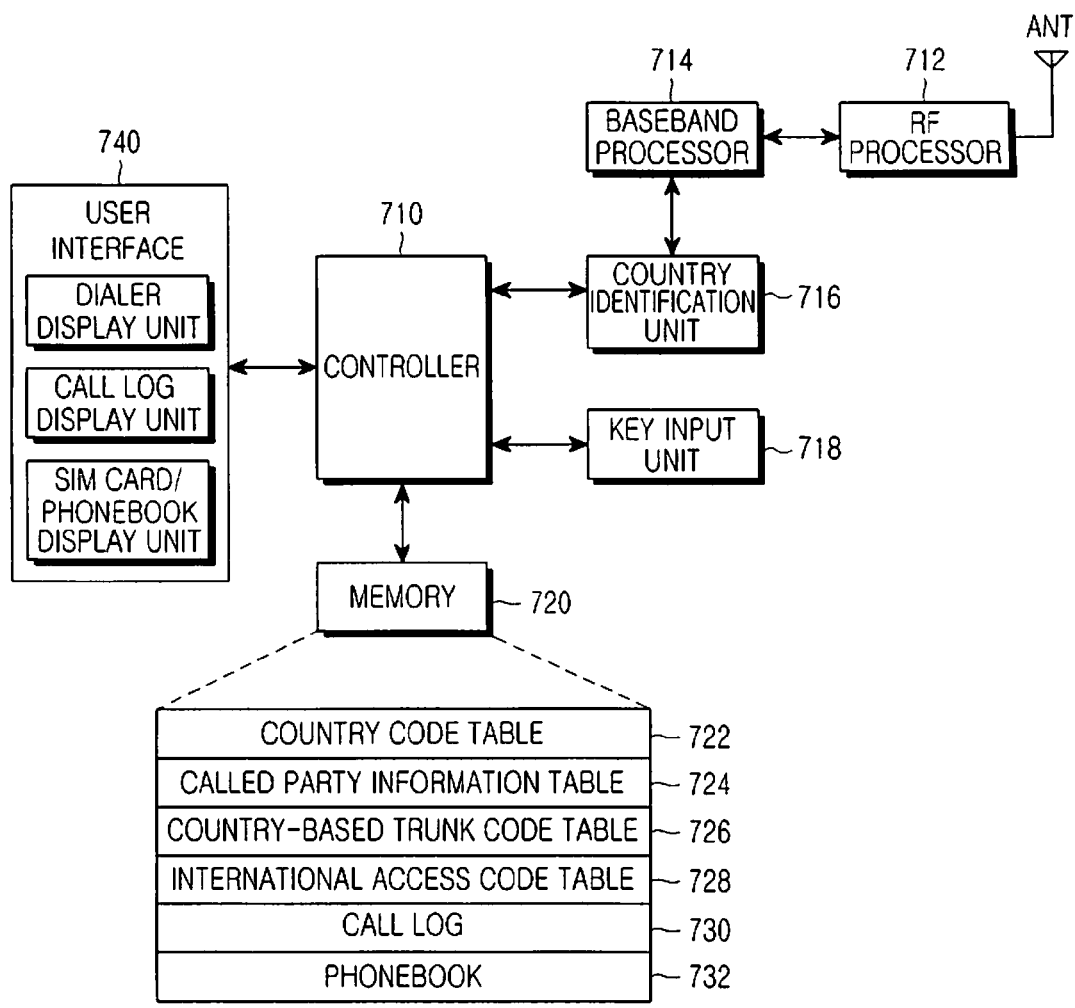
FIG. 7 is a block diagram illustrating an apparatus for providing automatic international call dialing in a mobile communication terminal according to an embodiment of the present invention.

FIG. 7 is a block diagram illustrating an apparatus for providing automatic international and local call dialing in a mobile communication terminal according to an embodiment of the present invention.

Referring to FIG. 7, a mobile communication terminal in accordance with an embodiment of the present invention includes a controller 710, a Radio Frequency (RF) processor 712, a baseband processor 714, a country identification unit 716, a key input unit 718, a memory 720, and a user interface 740.

The country identification unit 716 receives MCC and MNC values, or country identification information, from PLMN information of a network in which the terminal is currently located, and outputs the received MCC and MNC values to the controller 710. As described above, the MCC and MNC values, or the country identification information, are information for identifying the country where the mobile communication terminal is currently located, and are identification values (e.g., 450 for South Korea and 330 for USA) based on the MCC and MNC information received from PLMN information of a network in which the terminal is currently located, according to an embodiment of the present invention.

The key input unit 718, which includes a plurality of alpha-numeric keys and function keys for executing various functions, outputs key data to the controller 710.

The controller 710 performs the overall control operation of the mobile communication terminal. In accordance with an embodiment of the present invention, the controller 710 performs operations corresponding to keys, which are input through the key input unit 718. More specifically, the controller 710 retrieves phone numbers from a phonebook 732 or a call log 730, which is stored in the memory 720, from the memory 720 based on the key which is input by the user through the key input unit 718, controls the user interface 740 to provide a call log display unit or a SIM card/phonebook display unit, and then makes an outgoing call to a phone number selected by the user. Additionally, the controller 710 determines whether a key input through the key input unit 718 is to call a phonebook or a call log. If the key input is not to call a phonebook or a call log, the controller 710 controls the user interface 740 to provide a dialer display unit, recognizing that the key input is made directly by the user, and then makes an outgoing call to the phone number.

Further, the controller 710 determines a type of an outgoing call, i.e., a local call or an international call, based on a plurality of information stored in the memory 720 using the MCC and MNC values received from the country identification unit 716, and makes an outgoing call according to the determination. More specifically, as described above, the controller 710 extracts a country code corresponding to MCC and MNC values that are received from the country identification unit 716 and mapped in a country code table 722, which is stored in the memory 720, determines whether the extracted country code is identical to a country code in the phone number that is requested by the user through the key input unit 718, and makes a local call or an international call according to the determination.

In addition, the controller 710 determines use/nonuse of a unique trunk code in each country, which is considered during making of the local call or international call, using a country-based trunk code table 726 stored in the memory 720, and deletes or adds a trunk code in the phone number when placing an outgoing call to the phone number.

The memory 720 may include a Read Only Memory (ROM), a Random Access Memory (RAM), a voice memory, etc., to store a plurality of programs and data needed to control an operation of the mobile communication terminal. Further, the memory 720 stores a program for executing a country code search process according to the present invention, and stores data generated during execution of the program.

Furthermore, the memory 720 stores data such as the country code table 722, a called party information table 724, the country-based trunk code table 726, an international access code table 728, the call log 730 and the phonebook 732, which should be considered in the controller 710 to make an outgoing call to the phone number, and provides the data to the controller 710.

The user interface 740 selectively displays (activates) the dialer display unit, the call log display unit or the SIM card/phonebook display unit under the control of the controller 710. The user interface 740, which includes a plurality of alphanumeric keys and function keys, outputs input data corresponding to the keys selected by the user to the controller 710. Such a user interface 740 can be the general key matrix or touch screen.

The RF processor 712 controls transmission/reception of voice/text data and control data under the control of the controller 710.

The baseband processor 714 modulates and demodulates data that is input and output to/from the RF processor 712.

As is apparent from the foregoing description, according to the above-described embodiments of the present invention, because country codes, area codes of each of the countries, and international access codes are stored in a memory of the mobile communication terminal, the user can easily search for a country code and an area code when making an outgoing call to a party in other country, or even when the user travels to another country and has no knowledge of international access codes used in that country.

In addition, a user making an international call to a phone number, which is stored with a country code, can make a local call using the same phone number, even if the user travels to the country to which the phone number belongs. Also, even though a user, who was making a local call to a certain phone number in a specific country, goes to another country, the user can easily make an outgoing call using the same phone number, e.g., a phone number stored in a call log or a phonebook that was created in the specific country, without having to know and input international access codes and country codes.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for providing automatic international and local call dialing in a mobile communication terminal, comprising:
   receiving a request for an outgoing call to a previously stored phone number from a user;
   receiving, by the mobile communication terminal, country identification information from a network in which the mobile communication terminal is currently located;
   determining, by the mobile communication terminal, a country code corresponding to the received country identification information;
   comparing, by the mobile communication terminal, the determined country code with a country code included in the previously stored phone number;
   determining, by the mobile communication terminal, whether the outgoing call to the previously stored phone number is for an outgoing international call or an outgoing local call, based on a result of the comparing;
   changing, by the mobile communication terminal, the previously stored phone number in accordance with an international phone number system of a pertinent country, when the outgoing call to the previously stored phone number is the outgoing international call;
   changing, by the mobile communication terminal, the previously stored phone number in accordance with a local phone number system, when the outgoing call to the previously stored phone number is the outgoing local call;
   dialing, by the mobile communication terminal, the changed phone number;
   receiving an incoming call;
   receiving country identification information from a network in which the mobile communication terminal is currently located;
   determining a country code corresponding to the received country identification information;
   storing the determined country code and a phone number corresponding to the incoming call; and
   displaying the determined country code and the phone number, in response to a call log request from the user.

2. The method of claim 1, wherein receiving the country identification information comprises receiving Mobile Country Code (MCC) and Mobile Network Code (MNC) information from Public Land Mobile Network (PLMN) information.

3. A method for providing automatic international and local call dialing in a mobile communication terminal, comprising:
   receiving a request for an outgoing call to a previously stored phone number from a user;
   receiving, by the mobile communication terminal, country identification information from a network in which the mobile communication terminal is currently located;
   determining, by the mobile communication terminal, a country code corresponding to the received country identification information;
   comparing, by the mobile communication terminal, the determined country code with a country code included in the previously stored phone number;
   determining, by the mobile communication terminal, whether the outgoing call to the previously stored phone number is for an outgoing international call or an outgoing local call, based on a result of the comparing;
   changing, by the mobile communication terminal, the previously stored phone number in accordance with an international phone number system of a pertinent country, when the outgoing call to the previously stored phone number is the outgoing international call;
   changing, by the mobile communication terminal, the previously stored phone number in accordance with a local phone number system, when the outgoing call to the previously stored phone number is the outgoing local call;
   dialing, by the mobile communication terminal, the changed phone number;

receiving an input phone number from the user for an outgoing call;

receiving country identification information from a network in which the mobile communication terminal is currently located;

determining a country code corresponding to the received country identification information;

storing the determined country code and the input phone number corresponding to the outgoing call; and displaying the determined country code and the input phone number, in response to a call log request from the user.

4. A method for providing automatic international and local call dialing in a mobile communication terminal, comprising:

receiving a request for an outgoing call to a previously stored phone number from a user;

receiving, by the mobile communication terminal, country identification information from a network in which the mobile communication terminal is currently located;

determining, by the mobile communication terminal, a country code corresponding to the received country identification information;

comparing, by the mobile communication terminal, the determined country code with a country code included in the previously stored phone number;

determining, by the mobile communication terminal, whether the outgoing call to the previously stored phone number is for an outgoing international call or an outgoing local call, based on a result of the comparing;

changing, by the mobile communication terminal, the previously stored phone number in accordance with an international phone number system of a pertinent country, when the outgoing call to the previously stored phone number is the outgoing international call;

changing, by the mobile communication terminal, the previously stored phone number in accordance with a local phone number system, when the outgoing call to the previously stored phone number is the outgoing local call;

dialing, by the mobile communication terminal, the changed phone number, wherein changing the previously stored phone number in accordance with the international phone number system of the pertinent country comprises:

determining that the determined country code is not identical to the country code included in the previously stored phone number; and changing the previously stored phone number by adding or deleting a trunk code depending on use/nonuse of the trunk code in a country corresponding to the country code included in the phone number.

5. The method of claim 4, wherein the trunk code represents a number added at a front of an area code or a mobile service identification code.

6. The method of claim 4, further comprising:

deleting a country code and a trunk code when the previously stored phone number is redialed as a local call in another country.

7. A method for providing automatic international and local call dialing in a mobile communication terminal, comprising:

receiving a request for an outgoing call to a previously stored phone number from a user;

receiving, by the mobile communication terminal, country identification information from a network in which the mobile communication terminal is currently located;

determining, by the mobile communication terminal, a country code corresponding to the received country identification information;

comparing, by the mobile communication terminal, the determined country code with a country code included in the previously stored phone number;

determining, by the mobile communication terminal, whether the outgoing call to the previously stored phone number is for an outgoing international call or an outgoing local call, based on a result of the comparing;

changing, by the mobile communication terminal, the previously stored phone number in accordance with an international phone number system of a pertinent country, when the outgoing call to the previously stored phone number is the outgoing international call;

changing, by the mobile communication terminal, the previously stored phone number in accordance with a local phone number system, when the outgoing call to the previously stored phone number is the outgoing local call;

dialing, by the mobile communication terminal, the changed phone number, wherein changing the previously stored phone number in accordance with the local phone number system comprises:

determining that the determined country code is identical to the country code included in the previously stored phone number; and changing the previously stored phone number such that the phone number has no country code and no international access code.

8. The method of claim 7, further comprising:

adding a country code and a trunk code to the previously stored phone number, when the previously stored phone number is redialed as an international call in another specific country, after being dialed as a local call.

9. An apparatus for providing automatic international call dialing in a mobile communication terminal, comprising:

a user interface including a touch screen configured to provide a dial pad for receiving a phone number from a user to make an outgoing call;

a communication unit configured to receive country identification information from a network in which the mobile communication terminal is currently located;

a memory; and a controller configured to dial the phone number for the outgoing call including a country code corresponding to the received country identification information using a mapping table, and to store the dialed phone number including the country code in a call log.

10. The apparatus of claim 9, wherein the controller is further configured to display the dialed phone number including the country code on the touch screen when the call log is accessed.

11. The apparatus of claim 9, wherein the country identification information comprises at least one of Mobile Country Code (MCC) and Mobile Network Code (MNC) information.

12. The apparatus of claim 9, wherein the mapping table includes area codes of each of the countries.

* * * * *